US011822984B1

(12) United States Patent
Chandrasekhar et al.

(10) Patent No.: US 11,822,984 B1
(45) Date of Patent: *Nov. 21, 2023

(54) AUTONOMOUS CONCURRENCY FOR SERVERLESS FUNCTIONS

(71) Applicant: Sedai Inc., Pleasanton, CA (US)

(72) Inventors: Hari Chandrasekhar, Highlands Ranch, CO (US); Aby Jacob, Trivandrum (IN); Mathew Koshy Karunattu, Kottayam (IN); Nikhil Gopinath Kurup, Tampa, FL (US); Suresh Mathew, San Ramon, CA (US); S Meenakshi, Ernakulam (IN); Sayanth S, Kottayam (IN); Akash Vijayan, Kozhikode (IN)

(73) Assignee: Sedai Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,170

(22) Filed: Mar. 8, 2023

Related U.S. Application Data

(63) Continuation of application No. 17/898,300, filed on Aug. 29, 2022, now Pat. No. 11,614,982.

(51) Int. Cl.
*G06F 9/54* (2006.01)

(52) U.S. Cl.
CPC .................... *G06F 9/547* (2013.01)

(58) Field of Classification Search
CPC .... G06F 9/5072; G06F 9/5077; G06F 3/0604; G06F 3/0659; G06F 3/067; H04L 63/083; H04L 63/20
See application file for complete search history.

(56) References Cited

U.S. PATENT DOCUMENTS

| 10,789,195 | B1 * | 9/2020  | Jha .......................... G06F 9/546 |
| 11,018,965 | B1 * | 5/2021  | Ibryam ................. H04L 67/101 |
| 11,044,173 | B1 * | 6/2021  | Mestery ............. H04L 41/0897 |
| 11,057,480 | B1 * | 7/2021  | Wells ...................... G06F 9/505 |
| 11,188,354 | B1 * | 11/2021 | Yu ....................... G06F 9/44563 |
| 11,188,364 | B1 * | 11/2021 | Sundaresan ........... G06F 9/4552 |
| 11,190,599 | B2 * | 11/2021 | Greenstein .......... H04L 67/1097 |
| 11,216,310 | B2 * | 1/2022  | Zhuo ..................... G06F 9/5083 |
| 11,388,210 | B1 * | 7/2022  | Sood .................... H04L 67/566 |
| 11,418,394 | B1 * | 8/2022  | Wells ................. H04L 41/0806 |

(Continued)

*Primary Examiner* — Mahran Y Abu Roumi
(74) *Attorney, Agent, or Firm* — Yantra Patents LLC; Anand P Narayan

(57) ABSTRACT

Implementations described herein relate to run-time management of a serverless function in a serverless computing environment. In some implementations, a method includes receiving, at a processor, based on historical run-time invocation data for the serverless function in the serverless computing environment, a first number of expected invocations of the serverless function for a first time period, determining, by the processor, based on the first number of expected invocations of the serverless function for the first time period, a second number of warm-up invocation calls to be made for the first time period, and periodically invoking the second number of instances of an extended version of the serverless function during the first time period, wherein the extended version of the serverless function is configured to load and initialize the serverless function and terminate without executing the serverless function.

20 Claims, 6 Drawing Sheets

(56) References Cited

U.S. PATENT DOCUMENTS

| | | | |
|---|---|---|---|
| 2018/0113793 A1* | 4/2018 | Fink | G06F 11/362 |
| 2020/0081745 A1* | 3/2020 | Cybulski | G06F 9/545 |
| 2020/0226024 A1* | 7/2020 | Lin | G06F 8/443 |
| 2021/0019277 A1* | 1/2021 | Jha | G06F 9/546 |
| 2021/0157649 A1* | 5/2021 | Ibryam | G06F 9/52 |
| 2021/0157657 A1* | 5/2021 | Craik | G06F 9/52 |
| 2021/0233045 A1* | 7/2021 | Singh | G06Q 20/12 |
| 2021/0320980 A1* | 10/2021 | Wells | H04L 67/56 |
| 2021/0329003 A1* | 10/2021 | Segal | H04L 63/104 |
| 2022/0075750 A1* | 3/2022 | Jha | G06F 13/42 |
| 2022/0156097 A1* | 5/2022 | Jain | G06F 17/16 |
| 2022/0300351 A1* | 9/2022 | Phelan | G06F 9/5072 |
| 2023/0077836 A1* | 3/2023 | Vohra | G06F 3/0604 711/213 |
| 2023/0188516 A1* | 6/2023 | Danilov | G06F 9/5072 726/7 |

\* cited by examiner

AUTONOMOUS CONCURRENCY FOR SERVERLESS FUNCTIONS

CROSS-REFERENCE TO RELATED APPLICATIONS

This application is a continuation of U.S. patent application Ser. No. 17/898,300, filed 29 Aug. 2022, titled "AUTONOMOUS CONCURRENCY FOR SERVERLESS FUNCTIONS" which is incorporated by reference herein in its entirety.

TECHNICAL FIELD

Embodiments relate generally to run-time management of serverless function architecture, and specifically to methods to mitigate cold start latency of serverless functions.

BACKGROUND

Some computing systems utilize distributed computing architectures, e.g., cloud based systems to host applications. The applications may be hosted across multiple computer systems that are operated by different service providers, and in many cases, using a variety of computing devices.

Some providers offer serverless computing services, whereby they provide backend services on an as-used basis, and enterprise users can use computing resources and are charged based on usage without having to reserve and pay for a fixed amount of bandwidth or number of servers.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for run-time management of a serverless function in a serverless computing environment. The computer-implemented method also includes receiving, at a processor, based on historical run-time invocation data for the serverless function in the serverless computing environment, a first number of expected invocations of the serverless function for a first time period; determining, by the processor, based on the first number of expected invocations of the serverless function for the first time period, a second number of warm-up invocation calls to be made for the first time period; and periodically invoking the second number of instances of an extended version of the serverless function during the first time period, where the extended version of the serverless function is configured to load and initialize the serverless function and terminate without executing the serverless function. Other embodiments of this aspect include corresponding computer systems, apparatus, and computer programs recorded on one or more computer storage devices, each configured to perform the actions of the methods.

Implementations may include one or more of the following features. The computer-implemented method where the second number of the extended version of the serverless function is periodically invoked at a predetermined frequency. Determining the second number of warm-up invocation calls may include calculating a sum of the first number of expected invocations and a buffer number of warm-up invocation calls. The buffer number of warm-up invocation calls is the greater of 105% of the first number of expected invocations and 2. The buffer number of warm-up invocation calls is based on a multiplier of the first number of expected invocations for the serverless function that meets a threshold, and where the buffer number of warm-up invocation calls is assigned to a particular number for serverless functions that do not meet the threshold. The computer-implemented method may include receiving at the processor, one or more indicators of shutdown of run-time instances of the serverless function. The multiplier is adjusted based on the one or more indicators of shutdown of run-time instances of the serverless function. The serverless function is a version controlled serverless function, and where determining the second number of warm-up invocation calls to be made for the first time period further may include: setting a provisioned concurrency for the serverless function to a third number that is based on a peak load for the serverless function observed in the historical run-time invocation data for the serverless function for the corresponding time period; and setting the second number of warm-up invocations calls to a fourth number. The computer-implemented method may include determining the third number and the fourth number based on evaluating the historical run-time invocation data sequentially for different settings of provisioned concurrency, and determining an optimal setting based on a total expected cost. The historical run-time invocation data may include a seasonality model based on historical run-time invocation data obtained over a duration of at least a month. Generating the extended version of the serverless function may include: receiving, via user interface, a request to generate the extended version of the serverless function; determining a language associated with the serverless function; and applying a language specific layer to the serverless function to generate the extended version of the serverless function. The first time period is about 7 minutes, about 15 minutes, about 30 minutes, or about 1 hour. Implementations of the described techniques may include hardware, a method or process, or computer software on a computer-accessible medium.

The non-transitory computer-readable medium also includes determining, at the processing device, using historical run-time invocation data for a serverless function in a computing environment, a first number of expected invocations of the serverless function for a first time period; determining, by the processing device, based on the first number of expected invocations of the serverless function for the first time period, a second number of warm-up invocation calls to be made for the first time period; and periodically invoking, in the computing environment, the second number of instances of an extended version of the serverless function, where the extended version of the serverless function is configured to load and initialize the serverless function and terminate without executing the serverless function. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the serverless function is a version controlled serverless function, and where determining the second number of warm-up invocation calls to be made for the first time period further may include: setting a provisioned concurrency for the serverless function to a third number that is based on a peak load for the serverless function observed in the historical run-time invocation data for the serverless function for the corresponding time period; and setting the second number of warm-up invocations calls to a fourth number. The non-transitory computer-readable medium may include determining the third number and the fourth number based on evaluating the historical run-time invocation data sequentially for different settings of provisioned concurrency, and determining an optimal setting based on a total expected cost. The historical run-time invocation data may include a seasonality model based on run-time invocation data obtained over a duration of at least a month. Implementations of the described techniques may include hardware, a method or process, or computer software on a computer-accessible medium.

The system also includes a memory with instructions stored thereon. The system also includes a processing device, coupled to the memory, the processing device configured to access the memory and execute the instructions, where the instructions cause the processing device to perform operations including: receiving, at the processing device, using historical run-time invocation data for a serverless function a first number of expected invocations of the serverless function for a first time period; determining, by the processing device, based on the first number of expected invocations of the serverless function for the first time period, a second number of warm-up invocation calls to be made for the first time period; and periodically invoking the second number of times during the first time period, an extended version of the serverless function, where the extended version of the serverless function is configured to load and initialize the serverless function and terminate without executing the serverless function. Other embodiments of this aspect include corresponding computer systems, apparatus, and computer programs recorded on one or more computer storage devices, each configured to perform the actions of the methods.

Implementations may include one or more of the following features. The system where determining the second number of warm-up invocation calls may include calculating a sum of the first number of expected invocations and a buffer number of warm-up invocation calls. The buffer number of warm-up invocation calls is based on a multiplier of the first number of expected invocations for serverless functions that meet a threshold, and where the buffer number of warm-up invocation calls is assigned to a particular number for serverless functions that do not meet the threshold. The operations further may include generating the extended version of the serverless function, where generating the extended version of the serverless function may include: receiving, via user interface, a request to generate the extended version of the serverless function; determining a language of the serverless function based on metadata associated with the serverless function; and applying a language specific layer to the serverless function to generate the extended version of the serverless function. Implementations of the described techniques may include hardware, a method or process, or computer software on a computer-accessible medium.

DETAILED DESCRIPTION

Figure 1:
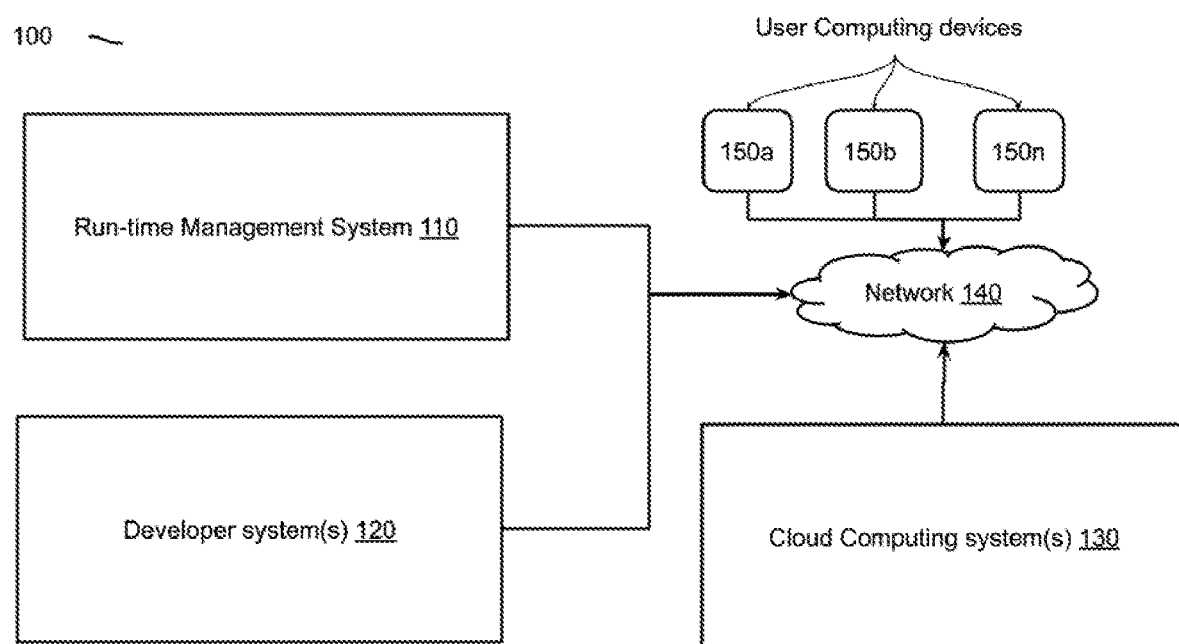
FIG. 1 is a diagram of an example system environment to provide autonomous concurrency for serverless functions, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Similarly, references in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same embodiment or implementation. Further, when a particular feature, structure, or characteristic is described in connection with an embodiment, such feature, structure, or characteristic may be implemented in connection with other embodiments whether or not explicitly described.

Today's extremely competitive global market calls for a high degree of business agility and responsiveness to customer needs and tastes. The introduction rate of new features via software releases has steadily increased to meet ever-evolving customer needs, and innovative computing architectures such as cloud native microservice architectures are becoming the new norm. Releases have risen to hundreds per month with a consequent impact on the roles and responsibilities of Site Reliability Engineers (SRE) who are tasked with managing the computing environment.

Technical outages to computing systems can have significant business implications. For example, Costco warehouse, with over 100 million members, had one of its biggest outages on Thanksgiving Day in 2019, impacting close to 2.6 million of its customers and causing more than $11 million in losses. On the same day, Home Depot, H&M, and Nordstrom customers too reported issues with their e-commerce sites. According to the Information Technology Industry Council (ITIC), 86% of the companies estimate that an hour of downtime can cause a greater than $300,000 revenue loss, and for 34% of companies, anywhere from $1 to $5 million.

RetailTouchPoints reported that for Black Friday shoppers specifically, nearly half of consumers (49%) say they will abandon their cart if they receive any error message during checkout that prevents them from completing their purchase. Shoppers who have to wait six seconds are 50% less likely to make a purchase, and 33% of shoppers will visit a competitor if the site they are currently on is slow to load.

For more critical services like health care, the stakes are much higher. Dexcom, a leader in continuous glucose monitoring systems, had a service outage for more than 24 hours, which resulted in irate customers and lives at risk.

With businesses increasingly earning larger revenue shares from online commerce, CTOs and SRE organizations are under tremendous pressure to achieve high levels of site availability at the most optimal costs—all while satisfying ever-increasing regulatory pressures.

In the pre-DevOps/Cloud era, monolithic services designed site architectures for product and software releases once or twice a year. However, businesses' modern needs now dictate faster responses to market signals. With the advent of cloud technology and simultaneous services segmentation, product features can be released quicker than ever—sometimes more than 50 times per year. But alongside an increased churn rate for features and versions comes elevated management costs.

Cloud adoption, virtualization, and DevOps maturity have led to agile deployment strategies and reduced time to market (TTM), which allows businesses to compete more effectively. Automation played a vital role on the road to achieving agile deployment—processes transitioned from being imperatively managed by a set of system administrators with command line interface, to being declaratively managed by a much smaller team of administrators in a distributed framework.

Organizations commonly utilize multiple cloud providers to implement their computing solutions. For example, an organization may utilize offerings from one or more providers, e.g., Amazon Web Services (AWS), Google Cloud Platform (GCP), Microsoft Azure etc., to implement their solution architecture. Metrics associated with their solution architecture and applications running over their architecture may be provided by multiple monitoring providers.

A typical software product implemented via a microservices based architecture may include hundreds of underlying applications. For example, a money transfer application may include multiple microservices operating using a combination of parallel and sequential processes, e.g., a client login microservice, a pre-validation check microservice, a microservice that performs funds availability verification, a risk analysis microservice to investigate fraud or other unauthorized transaction, etc.

One implementation of a microservice based architecture is a serverless computing system that enables enterprises to use distributed computing services and only pay based on actual use. This can offer cost savings over traditional server based architectures. It must be emphasized that serverless computing systems are serverless only to the developer user or to the enterprise/customer using the service and is typically backed by servers and other devices and architectural elements that operate behind-the-scenes and are transparent to the enterprise user that is utilizing the service.

A serverless computing service commonly utilizes event-driven (trigger based) programming (or publish-subscribe programming), auto-scaling, and a pricing model that is based on resource utilization. For example, a programmer can encode an event-driven program as a set of event-action pairs, and can upload the event-driven program to a service. The system monitors events, and maintains a pool of worker devices, which are utilized to process the actions upon detection of an event. In this manner, a limited set of resources can be shared amongst many enterprise users, while charging an enterprise user only for use, and not for uptime. A serverless computing application running on a serverless computing platform generally only consumes a resource (e.g., a worker device and/or associated storage) when active. In contrast, a cloud-hosted application consumes resources (e.g., a certain number of central processing unit cycles) for the duration of its deployment, even when the resources may not be specifically utilized, e.g., to run an application.

Serverless computing, or "function-as-a-service (FaaS)," provides stateless computing with flexible scaling and a pay-for-what-you-use price structure. In contrast to virtual machine (VM) based architecture and physical servers, users of serverless computing services are not required to provision/manage VMs or physical servers, and can instead build applications as a set of functions that run over the serverless computing environment. Resource provisioning and scaling are then handled by a cloud service provider of the serverless computing environment. Amazon Web Services (AWS) Lambda®, Google Cloud Function®, Azure® functions, etc. are just some of a number of commercially available serverless computing services.

Serverless functions/code can be used in conjunction with code deployed in traditional styles, such as in microservices. Alternatively, applications can be written to be purely serverless and to use no provisioned services at all.

FaaS platforms do not require coding to a specific framework or library, and support stand-alone computing. FaaS functions are regular (callable) functions with respect to programming language and environment. Typically, functions in FaaS platforms are triggered by event types defined by a cloud service provider. Functions can also be triggered by manually configured events or when a function calls another function. For example, in Amazon® AWS, triggers can include file updates (e.g., S3 updates), time based updates (e.g., scheduled tasks), and detection/receipts of messages that may be added to a message bus or queue. A function programmer would typically have to provide parameters specific to the event source that the particular function is tied to.

A serverless function may be programmed and deployed using command line interface (CLI) tools, an example of which is a serverless framework. In most cases, the deployment may be automatic, and the function's code is uploaded to a code repository on the FaaS platform. A serverless function can be written in any of the different supported programming languages, such as JavaScript®, Python®, Java®, etc. A function typically includes a handler (e.g., handler.js) and third-party libraries accessed by the code of the function. A framework file is utilized to define events and triggers as part of its configuration. A configuration file defines at least one event that triggers the function and a set of resources to be utilized, initialized, deployed, or accessed by the function.

The functions may be programmed by developers associated with the enterprise users, who may then provide (e.g., upload) them to the cloud computing provider. Functions may be programmed in both a version-control mode as well as non version-controlled mode.

In a non-version controlled mode, only a single version of the program is available for execution and is considered to be an "unpublished" function. In a version controlled mode, multiple versions of a function may be checked-in, e.g., by a developer, and "published" on the computing platform. A version controlled mode also enables multiple versions of a function to be deployed simultaneously, for example, to interoperate with other functions and/or applications.

Some serverless function developers utilize software containers to run applications. Software containers effectively virtualize an operating system and isolate the application's dependencies from other containers running on the same machine.

Containers may utilize a container engine and a container image, which is a package that includes an application (e.g., software application) and its associated dependencies. The container engine runs applications in containers, thereby isolating them from other applications running on the host machine. This removes the need to run a separate operating system for each application, allowing for higher resource utilization and lower costs.

One of the main advantages of using software containers is the relatively fast load times when compared to virtual machines. Load times are an important parameter to ensure efficient operation of FaaS architectures. However, the load time can be high when a new software container is invoked, and can lead to a delay, commonly referred to as a cold start latency.

Specifically, a cold start is the latency experienced when a serverless function is triggered. When a serverless computing provider (cloud provider) allocates an instance of a function, the runtime environment loads the function's code and runs initialization code that is defined outside of the handler. If the code and dependencies are large, or if SDK clients are created during initialization, this process can take some time. When any function has not been used for a period of time, or needs additional instances to scale up, or when an updated version of the function is deployed, the serverless computing provider creates new execution environments. This causes the portion of requests that are served by new instances to have higher latency than the rest, and is referred to as a cold start. A cold start occurs when there is no idle software container available waiting to run the function's code. The lack of an idle software container requires invoking a new software container in the FaaS infrastructure. Once the container is invoked, its instance stays alive and can be reused for subsequently triggered requests. Enterprise users may or may not have control or visibility when containers are shutdown (killed) in the FaaS infrastructure. Cold start times for different platforms can range between 5 and 20 minutes, depending on the specific deployment. Cold starts can negatively affect the user experience due to slow response, can cause timeouts in the calling function or through a chain reaction, etc. Cold start latency degrades the operation and performance of applications utilizing serverless functions.

Provisioned concurrency is a solution offered by some cloud computing platforms, whereby a specified number of instances of the function are kept active with all the necessary initializations such that cold starts can be avoided when instances of the functions (upto the specified limit) are invoked. The use of provisioned concurrency on some platforms may be supported on version controlled and/or published functions, and may not be supported for non version controlled functions. Provisioned concurrency is charged to the user, and can be expensive, particularly if unutilized or underutilized.

A technical problem in the software arts is the mitigation of cold starts, particularly in serverless distributed computing systems. Cold starts can lead to poor system performance, link failures, and can lead to poor user experience.

Techniques described in this disclosure can be utilized to mitigate cold starts. A historical model and/or seasonality model is utilized to predict a number of instances of a serverless function expected for a given time period. Based on the prediction, a buffer number of instances is added to account for differences between historical trends and current traffic patterns. A suitable number of instances are invoked using warm-up calls by a run-time management system, thereby ensuring that adequate instances of a particular serverless function are always up and running when a new request or event trigger is received.

In some implementations, the required number of instances to be kept up is distributed between provisioned concurrency instances and warm-up invocations. Techniques described in this disclosure can be utilized to improve the performance of serverless computing systems, and particularly to mitigate cold start latency.

FIG. 1 is a diagram of an example system environment 100 to provide autonomous concurrency for serverless functions, in accordance with some implementations.

FIG. 1 depicts a run-time management system 110 that may be utilized to provide autonomous concurrency for serverless functions in a serverless computing environment. The run-time management system 110 is connected via network 140 to one or more cloud computing system(s) 130 that provide distributed computing services to one or more enterprise users. The distributed computing services may include serverless computing services, also referred to as a FaaS (Function as a Service).

The run-time management system is communicatively coupled to one or more developer system(s) 120 and may provide services such as monitoring, and management of the computing resources utilized by the developer systems in servicing their end-users.

One or more developer system(s) 120 represents computing devices associated with enterprise users who are providing services and applications over the network to one or more end-users who may access the computing services via respective user computing devices 150a-150n.

Figure 2A:
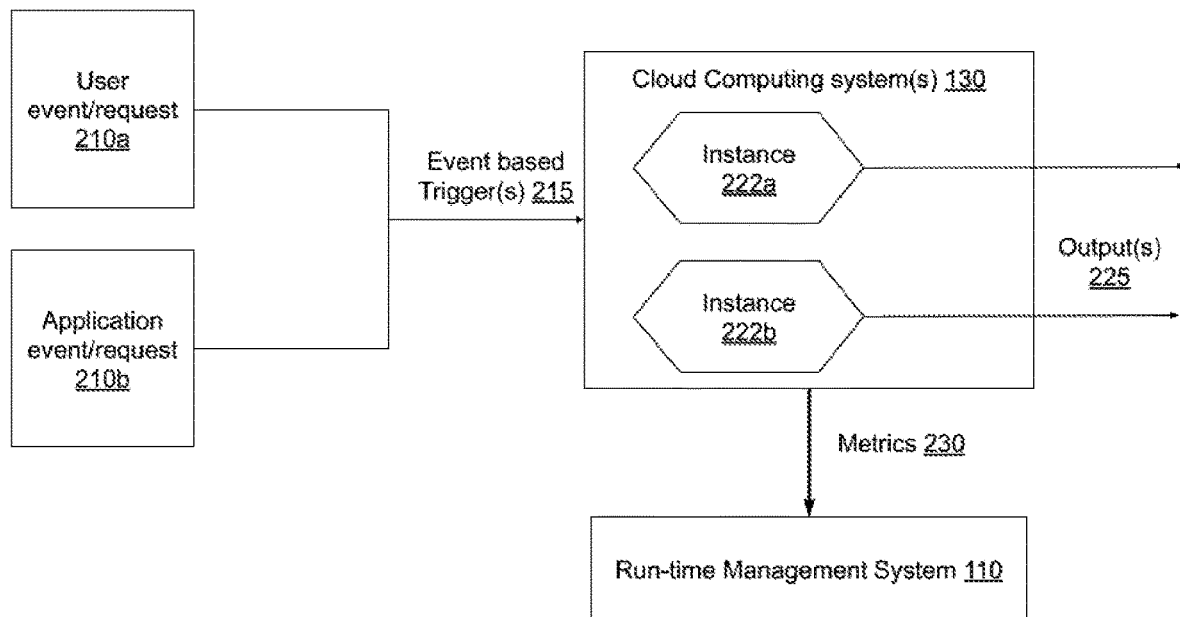
FIG. 2A depicts an example implementation of a serverless function in a distributed (cloud) computing environment, in accordance with some implementations.

FIG. 2A depicts an example implementation of a serverless function in a distributed (cloud) computing environment, in accordance with some implementations.

A serverless function environment, sometimes referred to as a Function as a service (FAAS), enables a user to utilize infrastructure hosted by a third party provider. The execution of the function is based on a trigger/event trigger based on a user or application action. For example, as depicted in FIG. 2A, event based triggers 215 may originate from a user request or event 210a that may originate on a user device. For example, a user may initiate an upload of a picture, e.g., of a check, from their mobile device, which may serve as an event trigger.

Event based triggers may also originate based on an application event/request 210b, which may be another software application that triggers an event request.

Based on the event trigger, a cloud computing system 130 may invoke an instance 222a or 222b and execute a serverless function associated with the event trigger. The code for the serverless function may be typically previously provided by the enterprise, e.g., as a container, code, function call, etc. For example, in the scenario described earlier, the serverless function may be a codeset (code) that compresses the uploaded picture, and stores it in a database for subsequent access.

Each instance or execution of the serverless function may generate one or more outputs 225, writes to one or more database(s), output to user devices etc.

Per techniques of this disclosure, one or more performance metrics 230 may be provided to the run-time management system 110, on a continuous or periodical basis, or be provided indirectly via a database or a monitoring system.

The metrics may include data that is aggregated as well as individual data points, and may include metrics such as arrival data for requests and/or queries that trigger the function(s), latency for each request, runtime, memory utilized, start-up time, etc. In some implementations, the metrics may also include costs, e.g., monetary costs, associated with the execution of the function.

Figure 2B:
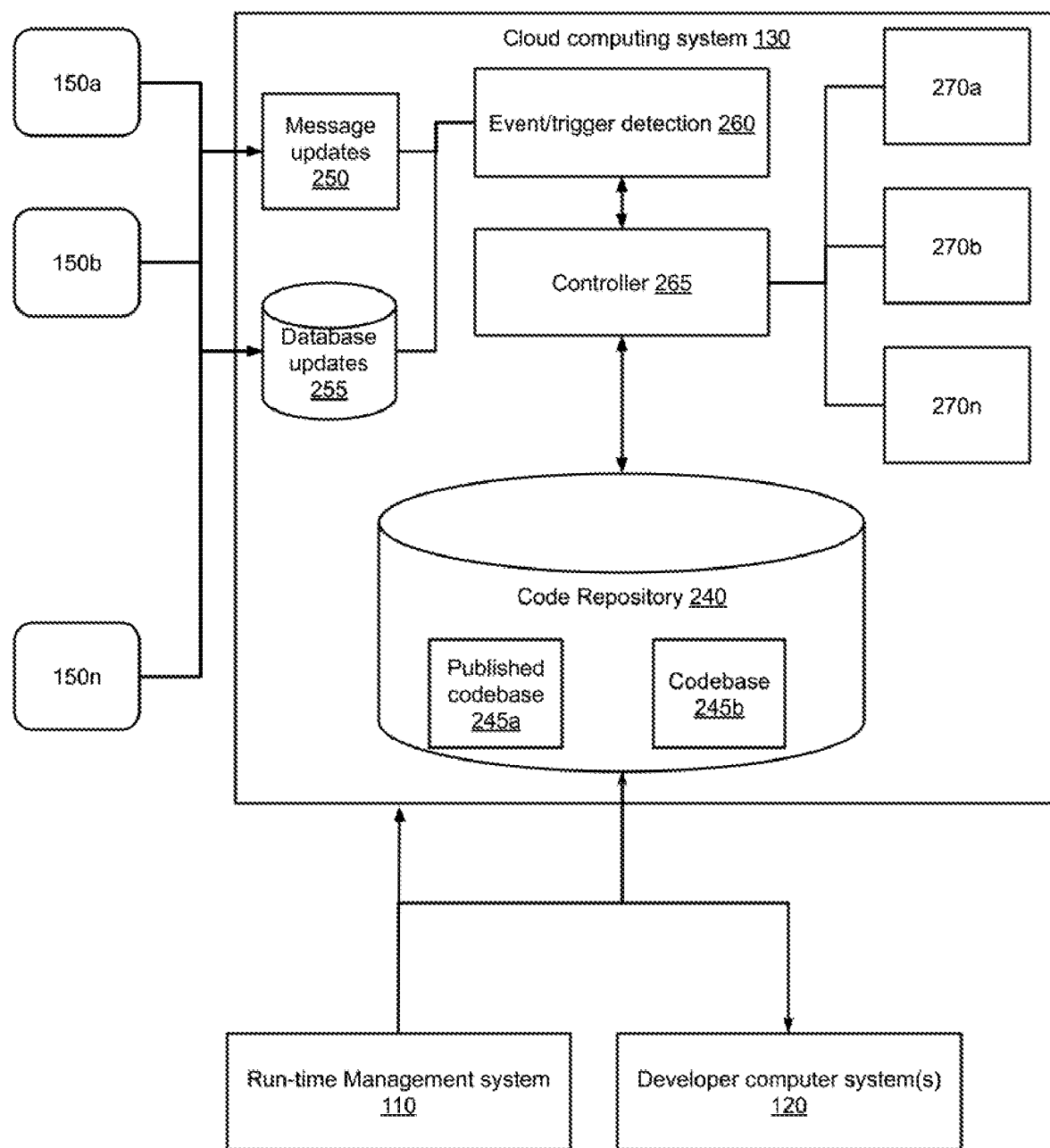
FIG. 2B depicts an example of a serverless (cloud) computing environment, in accordance with some implementations.

FIG. 2B depicts an example of a serverless (cloud) computing environment, in accordance with some implementations.

As depicted in FIG. 2B, the serverless (cloud) computing system 130 is coupled to run-time management system 110, to one or more developer system(s) 120, and user computing devices 150a-150n.

The serverless computing system includes a code repository 240 that may in turn include a published codebase 245a and an unpublished codebase 245b. The code repository may include images, files, linkages, and other software elements that are utilized to execute a serverless function in a serverless computing environment. The serverless computing system also includes computing devices 270a-270n, which include processors and storage, and which may be assigned as instances based on the computing requirements.

Serverless functions can be invoked based on event based triggers, which can be changes/updates to a message queue or based on database updates, e.g., a file uploaded to storage. In this illustrative example, the serverless computing system includes a module for processing message updates 250 as well as a module for database updates 255. The events/triggers are detected by an event/trigger detection module 260.

A controller 265 responds to detected events/triggers and assigns one or more of hardware elements 270 to perform (execute) the function, thereby setting up an instance of the serverless function. Setting up of the serverless function can include initialization of the serverless function, which can include downloading a code, e.g., from codebase repository 240, setting up of containers, loading the code to be executed into memory, initializing and starting the code on the processors, e.g., processors associated with hardware elements 270a-270n.

The time duration for setup of a function is referred to as the cold start time. Once an instance has been set up, the serverless computing system may keep the instance in a frozen (paused) state for a specified period of time. Fresh invocations of the serverless function may not incur a cold start time, since the function is "warmed-up."

Figure 3:
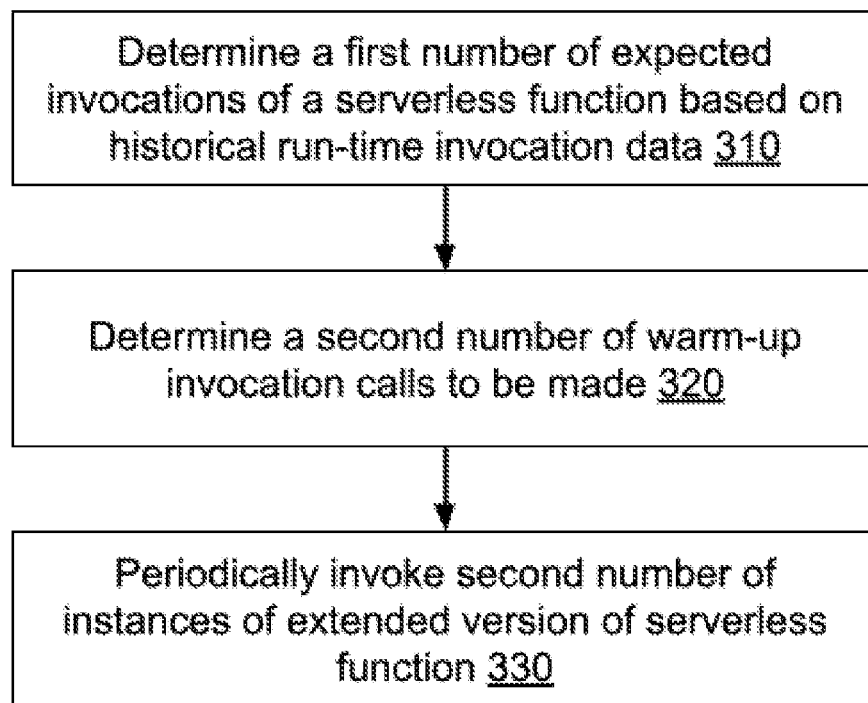
FIG. 3 is a flowchart illustrating an example method to manage a serverless function in a serverless computing environment, in accordance with some implementations.

FIG. 3 is a flowchart illustrating an example method to manage a serverless function in a serverless computing environment, in accordance with some implementations.

The distributed computing system may be a serverless computing system, and the software application may be a function or package configured to be executable on the serverless computing system. For example, the distributed computing system may be a containerized computing system, a Kubernetes cluster, a stateless application, a Platform as a service (PAAS), etc.

In some implementations, method 300 can be implemented, for example, on run-time management system 110 described with reference to FIG. 1. In some implementations, some or all of the method 300 can be implemented on one or more developer systems 120, on cloud computing system 130, as shown in FIG. 1, on and/or on a combination of the systems. In the described examples, the implementing system includes one or more digital processors or processing circuitry ("processors"), and one or more storage devices. In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices, cloud instances, or server devices) that can send results or data to the first device.

In some implementations, the method 300, or portions of the method, can be initiated automatically by a system. In some implementations, the implementing system is a first device. For example, the method (or portions thereof) can be periodically performed, or performed based on one or more particular events or conditions, e.g., receipt of an indication from a developer, reception of performance metric data, reception of events and/or messages from a cloud computing system, at a predetermined time, a predetermined time period having expired since the last performance of method 300, and/or one or more other conditions or events occurring which can be specified in settings read by the method.

Processing for run-time (operational) management of a serverless function in a serverless computing environment may begin at block 310. In some implementations, a request is received from a user, e.g., via a user interface, that specifies which of one or more serverless functions of a client user are to be specifically managed by the run-time management system.

At block 310, a first number of expected invocations of the serverless function for a first time period is received and/or determined. In some implementations, the first number of expected invocations is determined based on a historical model and/or historical run-time invocation data for the serverless function in the serverless computing environment. The historical model may take into account parameters such as day of the week, time of day, seasonality factors, e.g., time of year, holidays, etc.

In some implementations, the first number of expected invocations is a prediction based on the historical model that takes into account previous run-time data obtained of one or more serverless functions in the cloud (serverless) computing environment.

In some implementations, the historical run-time invocation data comprises a seasonality model based on historical run-time invocation data obtained over a duration of at least a month. The seasonality model includes parameters such as season of year, time, day of week, month, etc. In some implementations, the historical data includes data collected over a period of at least 1 month. In some other implementations, at least 2 months of data is utilized to build the seasonality model.

In some implementations, the historical run-time invocation data is region based. In some other implementations, the historical run-time invocation data may be aggregated across multiple regions and/or multiple providers.

Run-time data includes data such as number of instances of a serverless function deployed over time, metrics of cold start times for instances over time, etc. Run-time data may include data of the serverless function being managed and/or other serverless functions.

In some implementations, the run-time data may include streamed data, normalized metric data, and/or standardized metric data.

For example, the run-time data may include metrics such as invocation count (e.g., at a periodicity of about 5 minutes) that provides a measure of how many times a serverless function is invoked during a given time period.

In some implementations, the run-time data may include indicators such as a number of cold starts associated with a serverless function. In some implementations, a number of cold starts may be determined based on another received parameter such as initialization (init) duration for each invocation of a serverless function in a given window. For example, if an invocation of an instance of a serverless function had an init duration of zero, or nearly about zero, it may be determined to be not a cold start of the serverless function.

In some implementations, the run-time data may include an average duration (of execution) of a serverless function, an average cold start time, a number of concurrent invocations, and memory configuration(s) and concurrency configuration(s) of one or more serverless functions.

In some implementations, the first number may be received or obtained at a processor based on previously processed historical run-time data. In some implementations, the historical run-time data may be processed substantially in real-time just prior to the commencement of the time period to determine the first number of expected invocations.

The time-period may be a suitable time period selected based on a specified granularity that matches a time scale at which changes in system behavior are observed and/or measured. IN some implementations, the granularity may be automatically determined based on an analysis of traffic patterns, e.g., by an analysis of frequencies of one or more parameters in historical data. In some implementations, the time-periods are uniform. In some implementations, the time period can vary depending on the time of days, day of the week, etc. For example, during times of the day when the computing load is expected to be heavy, shorter time-period values may be used for the first time period, thereby enabling a more agile response. In some implementations, the first time period is non uniform and selected based on the expected number of invocations during a given time period. In some other implementations, the first time period is uniform and may be selected based on a single suitable value that provides coverage over all times. Data may be smoothed to select the time period.

In some implementations, the time period may be a value between 5 minutes and 2 hours. In some implementations, the first time period is 7 minutes, 15 minutes, 30 minutes, or 1 hour.

Block 310 may be followed by block 320.

At block 320, a second number of warm-up invocation calls to be made for the first time period is determined by the processor based on the first number of expected invocations of the serverless function for the first time period. In some implementations, the second number of warm-up invocation calls is determined by calculating a sum of the first number of expected invocations and a buffer number of warm-up invocation calls.

The buffer number of warm-up invocation calls is included so as to provide a figure of safety when compared to the predicted first number of expected invocations. The buffer number can be specified as a fixed number of instances, or be specified as a multiplier (a greater than one multiplier) of the first number. Specifying a multiplier enables a proportionately large buffer number for functions and conditions with a relatively large number of expected invocations.

In some implementations, a user may be provided with an option to specify a degree of safety in determining the buffer number. In such implementations, the buffer number is adjusted based on the specified degree of safety.

In some implementations, the buffer number is 5% of the first number (multiplier of 1.05), and the second number is therefore 105% of the first number. In some cases, the first number may be a relatively small number, and consequently, a calculated buffer number may be a number that is less than one, a non-integer number, etc. In such cases, the buffer number is rounded upwards to the nearest integral number to the calculated buffer number. In some implementations, the rounding up may be performed such that the buffer number has a minimum value of 2.

In some implementations, the buffer number of warm-up invocation calls is the greater of 105% of the first number of expected invocations and 2.

In some implementations, a threshold may be utilized such that for functions with a relatively large number of expected invocations, a multiplier is used to determine the buffer numbers, and whereas a fixed number is utilized as the buffer number for functions with relatively small number of expected invocations.

For example, the buffer number of warm-up invocation calls can be based on a multiplier of the first number of expected invocations for the serverless function that meets a threshold, and wherein the buffer number of warm-up invocation calls is assigned to a particular number for serverless functions that do not meet the threshold. Thus, the number of warm-up invocation calls are adjusted based on the predicted number of invocations, but adjusted upwards with a buffer. For low expected concurrency of invocations, fixed numbers are utilized for the buffer, and percentages for high expected concurrency. In some implementations, 10% is utilized as the buffer. In other implementations, 5% is utilized as the buffer.

In some implementations, the criticality of the serverless function is utilized to determine the buffer number. For example, a greater buffer number may be utilized for a first function when compared to a second function based on a criticality factor of the first function being specified to be greater than the criticality factor of the second function.

Block 320 may be followed by block 330.

At block 330, the second number of instances of an extended version of the serverless function is periodically invoked. In some implementations, the extended version of the serverless function is configured to load and initialize the serverless function and terminate without executing the serverless function.

In some implementations, the extended version is an internal extension of the serverless function which is structured identically to the original (non-extended version) serverless function, and is called in a similar manner and shares the same application program interface (API). For the purposes of warm-up calls, the extended version is designed as a wrapper around the original serverless function. When the extended version is called, the function is initialized just like the original serverless function, but after initialization, the underlying original serverless function is not called, and the extended version terminates without executing the serverless function. This has the effect of loading the code base into memory thereby initializing variables, memory allocation, etc.

In some implementations, the extended version of the serverless function is an internally extended version of the serverless function, whereas in other implementations, the extended version of the serverless function is an externally extended version of the serverless function.

Extended versions generally are designed as wrappers around a serverless function; external extended versions run in parallel as a separate process and may be utilized by the run-time management system, e.g., to obtain information about container shutdowns and terminations.

In some implementations, an internal extended version of a serverless function executes (runs) in the same process as the original (non-extended) serverless function.

In some implementations, the extended version of one or more serverless functions is generated automatically by a run-time management system based on a signal or request received from a user, e.g., a client user.

In some implementations, metadata associated with a serverless function is utilized to determine a language, e.g., a programming language, associated with the serverless function. For example, based on metadata associated with a serverless function, a version and language, e.g., Node, Python, etc., of the serverless function may be determined.

In some implementations, a language specific layer or extension (file system layer) is maintained for each programming language. In some other implementations, a single extension is utilized for all programming languages.

The layer is applied to the serverless function, e.g., via an Application Programming Interface (API). For example, an API may be called by the run-time management system to generate an extended version of a serverless function for which run-time management of the serverless function is requested.

Extended internal functions are tightly wrapped around the original serverless function, and are commonly programmed in the same programming language as the original function. When the serverless function is invoked, it is invoked using certain parameters. In some implementations, all invocations of the serverless function lead to the extended version being invoked (whether by a user or by the run-time management system invoking a warm-up call). Upon initialization, it is determined based on the parameters whether the invocation was a warm-up call (based on one or more headers, received parameter(s) or flag(s)), and if it is determined (e.g., based on a determination) that the invocation was a warm-up invocation call, the serverless function terminates without executing the actual serverless function. Only initialization operations are performed in this case.

If it is determined that it is not a warm-up call, and is an actual user triggered invocation, then the serverless function executes as originally intended, performs per its designed functionality, and returns results, e.g., similar to outputs 225 described with respect to FIG. 2A.

In some implementations, an extended version is previously generated at the run-time management system. Each serverless function for which autonomous concurrency is supported has a corresponding extended version of the serverless function, wherein an extended version is generated for each programming language and processor architecture (32 bit, 64 bit, ARM version, etc.). A developer user may be enabled to invoke autonomous concurrency by selection, e.g., via a user interface.

In some implementations, upon termination, the instance is kept frozen (also referred to as staying warmed up or alive) awaiting a fresh invocation of the serverless function. Any invocations, whether warm-up or actual requests/triggers can be executed without incurring any cold start or latency since the instance is up and running.

The periodic invocation calls are made at a periodicity that is based on the time period that an instance is kept frozen upon completion of execution. In some implementations, the second number of the extended version of the serverless function is periodically invoked at a predetermined frequency. This is a design parameter of the cloud computing provider, and may be provided to the run-time management system or be determined/inferred at the run-time management system based on test cases.

In some implementations, test calls may be invoked by the run-time management system, and corresponding runtime data of cold start latency, time to shutdown of instance, etc. are obtained.

In some implementations, multiple instances of the extended version of the serverless function are invoked substantially synchronously, and the instances are invoked in parallel. Invoking the instances in parallel can ensure that the warm-up invocation calls are assigned/allocated to separate instances by the cloud computing provider and that the intended number of instances are available for user initiated invocations. In some implementations, the warm-up invocations are initiated at a specified time just before the commencement of the time period. Depending on the duration of the time period and the periodicity at which the warm-up invocations are performed, one or more sets of warm-up invocation calls may be invoked during the time period.

In some implementations, the run-time management system receives additional information from the cloud (serverless) computing provider. For example, the run-time management system may receive information about one or more performance metrics, container (or instance) initiations, container (or instance) shutdowns, traffic, etc.

In some implementations, one or more indicators of shutdown of run-time instances (container images) of the serverless function may be received at a processor of the run-time management system. In such implementations, the shutdown indicators are processed to determine the effectiveness of the warm-up invocation calls, and to adjust the buffer number and second number of warm-up invocation calls accordingly.

For example, if the container shutdown information is indicative of a large number of container/instance shutdowns (e.g., exceeding a threshold number of container/instance shutdowns for a defined block of time), a buffer number and second number may be reduced from their previous levels. This may be effective in conditions where the run-time management system has overprovisioned the number of containers/instances that are needed.

In some implementations the multiplier utilized to determine the second number is adjusted based on the one or more indicators of shutdown of run-time instances of the serverless function. For example, if the received information from terminating container(s) is indicative of shutdowns that exceed a predetermined threshold, a number of warm-up calls may be reduced by reducing the buffer number from a previous level.

In some implementations, the second number may be determined based on utilization of provisioned concurrency, whereby a specified number of instances of a serverless function are initialized and kept active (alive), even in the absence of incoming requests, invocations, and/or trigger events. In some implementations, the feature of provisioned concurrency is only available to published serverless functions, which are version controlled functions.

Where provisioned concurrency is utilized, based on the first number of expected invocations, a determination is made as to a level (e.g., a count or a setting) of provisioned concurrency that should be utilized, and the second number of warm-up invocation calls is determined. In some implementations, the level of provisioned concurrency is set to a third number that is based on a peak load for the serverless function observed in the historical run-time invocation data for the serverless function for the corresponding time period. A fourth number of warm-up invocation calls with use of provisioned concurrency is based on the remainder of the first number of expected invocations (that are not expected to be handled by the provisioned concurrency).

In some implementations, the peak load is based on a seasonality model determined based on historical data. For example, historical data may be analyzed for a specified period of time. For example, historical data for about between 2 weeks and about 4 weeks of data regarding invocations of a serverless function may be analyzed to determine an expected peak load for a future (or current) time period. The analysis may include an analysis of a variation between similar periods, e.g., Tue afternoon at 12 noon, across multiple occurrences of that time period in the historical data.

In some implementations, the peak load for a time period is based on a predicted number of requests for that time period obtained from the historical model at a predetermined confidence interval. For example, the peak load may be based on a 90% Confidence Interval estimate obtained from a seasonality model based on historical data. In some implementations, a 95% confidence interval estimate may be utilized.

In some implementations, a setting for provisioned concurrency is based on a distribution model of historical loads.

In some implementations, the serverless function is a version controlled serverless function, and determining the second number of warm-up invocation calls to be made for the first time period further includes setting a count for provisioned concurrency for the serverless function to a third number that is based on a peak load for the serverless function observed in the historical run-time invocation data for the serverless function for the corresponding time period, and setting the second number of warm-up invocations calls to a fourth number.

In some implementations, determining the third number and the fourth number is based on evaluating the historical run-time invocation data sequentially for different settings of provisioned concurrency, and determining an optimal setting based on a total expected cost.

For example, based on a distribution model of invocations, an operational cost may be determined for multiple settings of provisioned concurrency based on costs associated with provisioned concurrency.

In some implementations, the third number (of provisioned concurrency) and the fourth number (of warm-up invocation calls along with parallel use of provisioned concurrency) is determined based on evaluation of a total operational cost for the time period based on historical innovation patterns of the serverless function for a previous corresponding time period.

In some implementations, parameters such as a cost of provisioned concurrency, a traffic pattern (pattern of incoming events/triggers), serverless computing platform settings such as a period of time that an instance is kept alive (e.g., in a frozen state) after successful execution of the function, etc., are utilized to optimize cost and performance.

For example, one or more invocation patterns of the serverless function for a time period can be analyzed by sequentially setting different settings of the third number and the fourth number, and evaluating cost and performance, e.g., latency, timeouts, etc. This may be repeated for different settings to arrive at an optimal operating point.

In some implementations, an iterative technique is utilized whereby different levels of provisioned concurrency are simulated with previous historical patterns of invocations. Settings are selected such that a total cost is minimized while meeting specified performance metrics.

In some implementations, the optimal operating point for a time period is determined ahead of the time period, e.g., on a previous day, and monitoring data is utilized to adjust the model for future time periods.

In some implementations, some of the optimization is performed substantially in real-time. For example, settings of provisioned concurrency could be determined earlier, but shutdown information may be utilized to adjust the buffer numbers.

In some implementations, the periodically invoking of serverless functions is made sequentially at predetermined time intervals and/or interleaved with actual function invocations from users based on real-time information obtained from the serverless computing system. In some implementations, user level performance metrics can also be utilized by the run-time management system to determine one or more settings such as the second number, the buffer number, the third number, or the fourth number.

Blocks 310-330 can be performed (or repeated) in a different order than described above and/or one or more steps can be omitted. For example, in some implementations, blocks 310-320 may be omitted, and the method may commence directly at block 330 based on previously obtained and/or determined settings for the second number, buffer number, third number, and fourth number.

In some implementations, blocks 310-330 may be performed periodically based on the time periods, previously received metric data, traffic data, and performance data to generate recommendations for resource allocations, e.g., of memory, provisioned concurrency, etc. In some implementations, the recommendations may be autonomously implemented by the cloud management system.

Figure 4:
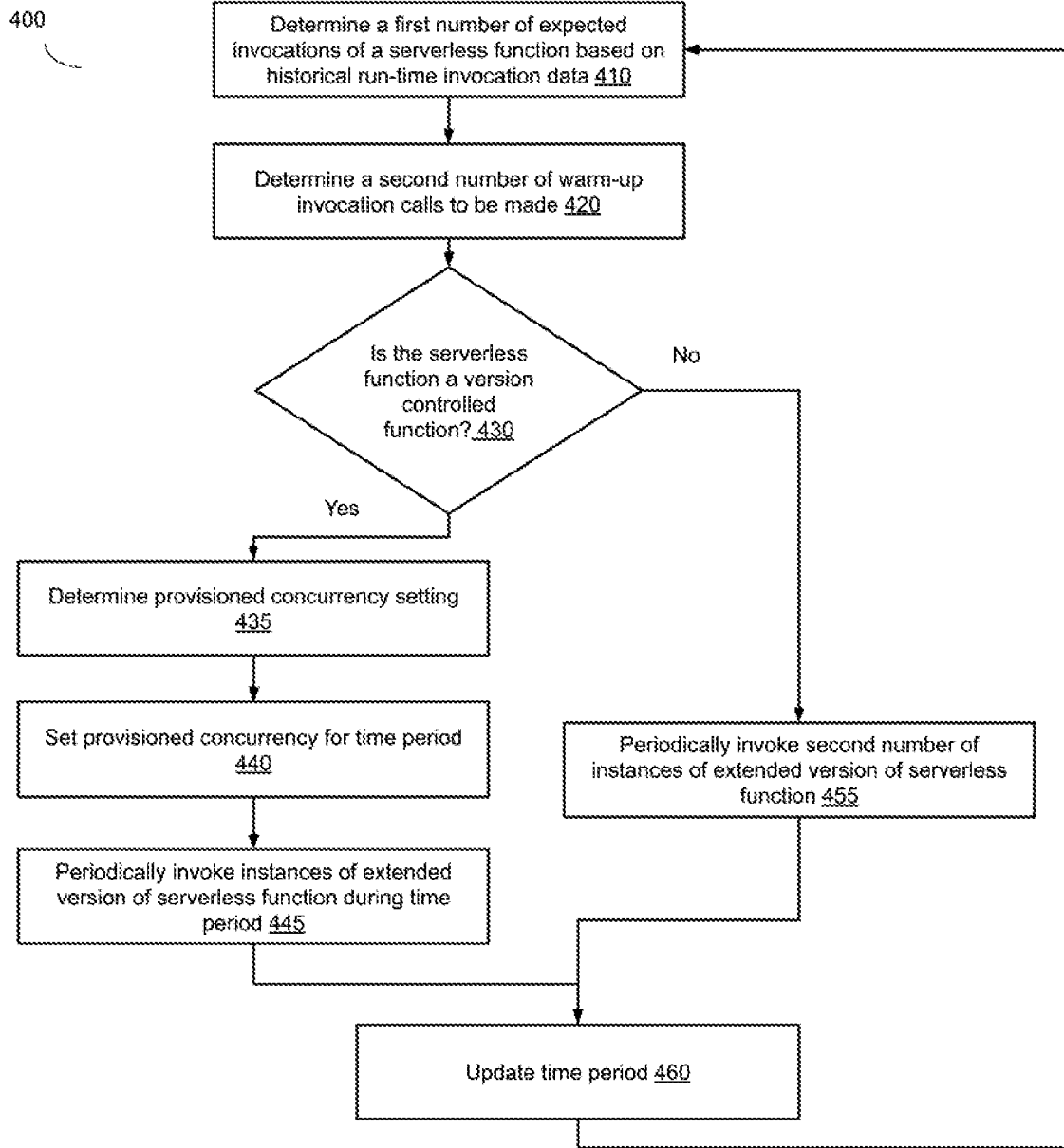
FIG. 4 is a flowchart illustrating another example method to manage a serverless function in a serverless computing environment, in accordance with some implementations.

FIG. 4 is a flowchart illustrating another example method to manage a serverless function in a serverless computing environment, in accordance with some implementations.

In some implementations, method 400 can be implemented, for example, on run-time management system 110 described with reference to FIG. 1. In some implementations, some or all of the method 400 can be implemented on one or more developer systems 120, on cloud computing system 130, as shown in FIG. 1, on and/or on a combination of the systems. In the described examples, the implementing system includes one or more digital processors or processing circuitry ("processors"), and one or more storage devices. In some implementations, different components of one or more servers and/or clients can perform different blocks or other parts of the method 400. In some examples, a first device or instance is described as performing blocks of method 400. Some implementations can have one or more blocks of method 400 performed by one or more other devices or instances (e.g., other client devices, instances of distributed computing systems, or server devices) that can send results or data to the first device or instance.

In some implementations, method 400, or portions of the method, can be initiated automatically by a system, e.g., a run-time management system. In some implementations, the implementing system is a first device. For example, the method (or portions thereof) can be periodically performed, or performed based on one or more particular events or conditions, e.g., reception of performance metric data, reception of events and/or messages from a cloud computing system, at a predetermined time, a predetermined time period having expired since the last performance of method 400, and/or one or more other conditions or events occurring which can be specified in settings read by the method.

Method 400 may begin at block 410.

At block 410, a first number of expected invocations of a serverless function is determined based on historical run-time data. In some implementations, the first number may be received based on a previous determination.

Block 410 may be followed by block 420.

At block 420, a second number of warm-up invocation calls is determined. The second number is a combination of the first number and a buffer number that enables the run-time management system to provide a figure of safety. The buffer number may be a predetermined percentage of the first number or be a fixed predetermined number of instances. In some implementations, the buffer number is based on a criticality factor of the serverless function being managed. In some implementations, a threshold may be utilized, and based on the first number meeting a threshold, a multiplier is utilized, and based on the first number not meeting the threshold, a fixed number of instances may be added to the first number to determine the second number.

Block 420 may be followed by block 430.

At block 430, it is determined whether the serverless function is a version controlled (or published) function for which the serverless computing platform supports provisioned concurrency. If it is determined that the serverless function is one that is compatible with provisioned concurrency, block 430 is followed by block 435, else block 430 is followed by block 455.

At block 435, a provisioned concurrency setting is determined. The setting is a third number and represents a recommended setting for provisioned concurrency. The setting may be determined based on an analysis of a historical pattern of invocations of the serverless function. For example, if it is determined that historically, a steady base rate of invocations has occurred throughout the time period, the provisioned concurrency setting may be set to the base rate of invocations.

In some implementations, the provisioned concurrency setting is determined based on a distribution model that takes into account historical data. For example, times associated with the trigger of a serverless function, and corresponding run times for each invocation may be utilized to determine a pattern of calls of the serverless function for different time periods. Sequentially, different settings for provisioned concurrency are applied and based on costs of provisioned concurrency versus the cost of warm-up calls, a provisioned concurrency setting is determined, Block 435 may be followed by block 440.

At block 440, the provisioned concurrency is set on the serverless computing platform based on the determination at block 435.

Block 440 may be followed by block 445.

At block 445, a fourth number of instances is periodically invoked. The fourth number is determined based on the expected number of invocations, a selected buffer number, and the number of instances that are associated with the provisioned concurrency setting (the third number).

Block 445 may be followed by block 460.

At block 460, the time period is updated, and block 460 may be followed by block 410 for a fresh time period.

If at block 430, it is determined that the serverless function cannot be supported with provisioned concurrency, block 430 is followed by block 455.

At block 455, the second number of instances of an extended version of the serverless function, corresponding to a number of warm-up invocation calls, is periodically invoked on the serverless computing environment (system).

Block 455 may be followed by block 460. At block 460, the time period is updated, and block 460 may be followed by block 410 for a fresh time period.

Blocks 410-460 can be performed (or repeated) in a different order than described above and/or one or more steps can be omitted. For example, in some implementations, blocks 410-420 may be omitted, and the method may commence directly at block 430 based on previously obtained and/or determined settings for the second number, buffer number, third number, and fourth number. In some implementations, block 420 may be performed subsequent to the performance of block 430.

In some implementations, blocks 410-460 may be performed periodically based on the time periods, previously received metric, traffic, and performance data to generate recommendations for resource allocations, e.g., of memory, provision concurrency, etc. In some implementations, the recommendations may be autonomously implemented by the cloud management system.

Figure 5:
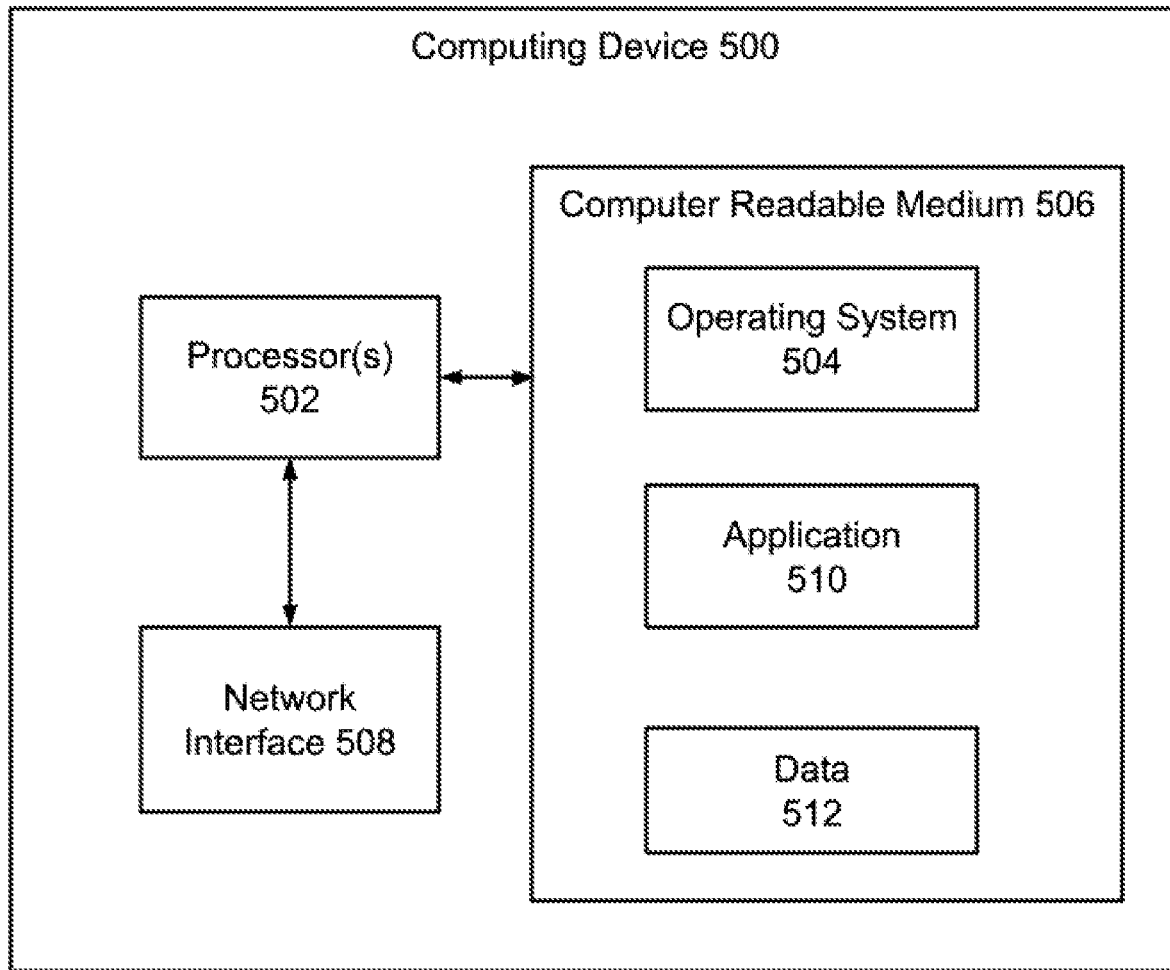
FIG. 5 is a block diagram of an example computing device, in accordance with some implementations.

FIG. 5 is a block diagram of an example computing device 500 which may be used to implement one or more features described herein. In one example, device 500 may be used to implement a computer device (e.g., 110, 120, 130, and/or 150 of FIG. 1), and perform appropriate method implementations described herein. Computing device 500 can be any suitable computer system, server, or other electronic or hardware device. For example, the computing device 500 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 500 includes a processor 502, a memory 504, input/output (I/O) interface 506, and audio/video input/output devices 514.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 506 is typically provided in device 500 for access by the processor 502, and may be any suitable processor-readable storage medium, e.g., random access memory (RAM), read-only memory (ROM), Electrical Erasable Read-only Memory (EE-PROM), Flash memory, etc., suitable for storing instructions for execution by the processor, and located separate from processor 502 and/or integrated therewith. Memory 504 can store software operating on the server device 500 by the processor 502, including an operating system 504, one or more applications 55 and application data 512. In some implementations, application 55 can include instructions that enable processor 502 to perform the functions (or control the functions of) described herein, e.g., some or all of the methods described with respect to FIGS. 3 and 4.

Elements of software in memory 506 can alternatively be stored on any other suitable storage location or computer-readable medium. In addition, memory 506 (and/or other connected storage device(s)) can store instructions and data used in the features described herein. Memory 506 and any other type of storage (magnetic disk, optical disk, magnetic tape, or other tangible media) can be considered "storage" or "storage devices."

An I/O interface can provide functions to enable interfacing the server device 500 with other systems and devices. For example, network communication devices, storage devices (e.g., memory and/or data store 120), and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 5 shows one block for each of processor 502, memory 506. These blocks may represent one or more processors or processing circuitries, operating systems, memories, I/O interfaces, applications, and/or software engines. In other implementations, device 500 may not have all of the components shown and/or may have other elements including other types of elements instead of, or in addition to, those shown herein. While the run-time management system 110 is described as performing operations as described in some implementations herein, any suitable component or combination of components of run-time management system 110 or similar system, or any suitable processor or processors associated with such a system, may perform the operations described.

A user device can also implement and/or be used with features described herein. Example user devices can be computer devices including some similar components as the device 500, e.g., processor(s) 502, memory 506, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 500 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 300 and/or 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices. In another example, all computations can be performed over the cloud within a distributed computing environment.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method for run-time management of a serverless function in a serverless computing environment, comprising:
   receiving, at a processor, based on historical run-time invocation data for the serverless function in the serverless computing environment, a first number of expected invocations of the serverless function for a first time period;
   determining, by the processor, based on the first number of expected invocations of the serverless function for the first time period, a second number of warm-up invocation calls to be made for the first time period; and
   periodically invoking the second number of instances of an extended version of the serverless function during the first time period, wherein the extended version of the serverless function is configured to load and initialize the serverless function and terminate without executing the serverless function.

2. The computer-implemented method of claim 1, wherein the second number of the extended version of the serverless function is periodically invoked at a predetermined frequency.

3. The computer-implemented method of claim 1, wherein determining the second number of warm-up invocation calls comprises calculating a sum of the first number of expected invocations and a buffer number of warm-up invocation calls.

4. The computer-implemented method of claim 3, wherein the buffer number of warm-up invocation calls is the greater of 105% of the first number of expected invocations and 2.

5. The computer-implemented method of claim 3, wherein the buffer number of warm-up invocation calls is based on a multiplier of the first number of expected invocations for the serverless function that meets a threshold, and wherein the buffer number of warm-up invocation calls is assigned to a particular number for serverless functions that do not meet the threshold.

6. The computer-implemented method of claim 5, further comprising receiving at the processor, one or more indicators of shutdown of run-time instances of the serverless function.

7. The computer-implemented method of claim 6, wherein the multiplier is adjusted based on the one or more indicators of shutdown of run-time instances of the serverless function.

8. The computer-implemented method of claim 1, wherein the second number of instances of the extended version of the serverless function are invoked substantially synchronously.

9. The computer-implemented method of claim 1, wherein the second number of instances of the extended version of the serverless function are invoked at a specified time before commencement of the first time period.

10. The computer-implemented method of claim 1, wherein the historical run-time invocation data comprises a seasonality model based on historical run-time invocation data obtained over a duration of at least a month.

11. The computer-implemented method of claim 1, further comprising generating the extended version of the serverless function, wherein generating the extended version of the serverless function comprises:
   receiving, via user interface, a request to generate the extended version of the serverless function;
   determining a language associated with the serverless function; and
   applying a language specific layer to the serverless function to generate the extended version of the serverless function.

12. The computer-implemented method of claim 1, wherein the first time period is about 7 minutes, about 15 minutes, about 30 minutes, or about 1 hour.

13. A non-transitory computer-readable medium comprising instructions that, responsive to execution by a processing device, cause the processing device to perform operations comprising:
   determining, at the processing device, using historical run-time invocation data for a serverless function in a computing environment, a first number of expected invocations of the serverless function for a first time period;
   determining, by the processing device, based on the first number of expected invocations of the serverless function for the first time period, a second number of warm-up invocation calls to be made for the first time period; and
   periodically invoking, in the computing environment, the second number of instances of an extended version of the serverless function, wherein the extended version of the serverless function is configured to load and initialize the serverless function and terminate without executing the serverless function.

14. The non-transitory computer-readable medium of claim 13, wherein the second number of instances of the extended version of the serverless function are invoked substantially synchronously.

15. The non-transitory computer-readable medium of claim 13, wherein the second number of instances of the extended version of the serverless function are invoked at a specified time before commencement of the first time period.

16. The non-transitory computer-readable medium of claim 13, wherein the historical run-time invocation data comprises a seasonality model based on run-time invocation data obtained over a duration of at least a month.

17. A system comprising:
   a memory with instructions stored thereon; and
   a processing device, coupled to the memory, the processing device configured to access the memory and execute the instructions, wherein the instructions cause the processing device to perform operations including:
   receiving, at the processing device, using historical run-time invocation data for a serverless function, a first number of expected invocations of the serverless function for a first time period;
determining, by the processing device, based on the first number of expected invocations of the serverless function for the first time period, a second number of warm-up invocation calls to be made for the first time period; and
   periodically invoking the second number of times during the first time period, an extended version of the serverless function, wherein the extended version of the serverless function is configured to load and initialize the serverless function and terminate without executing the serverless function.

18. The system of claim 17, wherein determining the second number of warm-up invocation calls comprises calculating a sum of the first number of expected invocations and a buffer number of warm-up invocation calls.

19. The system of claim 18, wherein the buffer number of warm-up invocation calls is based on a multiplier of the first number of expected invocations for serverless functions that meet a threshold, and wherein the buffer number of warm-up invocation calls is assigned to a particular number for serverless functions that do not meet the threshold.

20. The system of claim 17, wherein the operations further comprise generating the extended version of the serverless function, wherein generating the extended version of the serverless function comprises:
   receiving, via user interface, a request to generate the extended version of the serverless function;
   determining a language of the serverless function based on metadata associated with the serverless function; and
   applying a language specific layer to the serverless function to generate the extended version of the serverless function.

* * * * *